(12) United States Patent
Dillner

(10) Patent No.: US 8,813,720 B2
(45) Date of Patent: Aug. 26, 2014

(54) CYLINDER DEACTIVATION EMS CONTROL

(75) Inventor: Johan Dillner, Gothenburg (SE)

(73) Assignee: Denso Corporation, Kariya (JP)

(*) Notice: Subject to any disclaimer, the term of this patent is extended or adjusted under 35 U.S.C. 154(b) by 1248 days.

(21) Appl. No.: 12/656,352

(22) Filed: Jan. 27, 2010

(65) Prior Publication Data

US 2011/0180037 A1  Jul. 28, 2011

(51) Int. Cl.
*F02P 5/00* (2006.01)
*F02D 17/02* (2006.01)

(52) U.S. Cl.
USPC .................................................. 123/406.2

(58) Field of Classification Search
USPC ............... 123/198 F, 406.2, 406.23–406.25
See application file for complete search history.

(56) References Cited

U.S. PATENT DOCUMENTS

| | | | | |
|---|---|---|---|---|
| 5,374,224 A * | 12/1994 | Huffmaster et al. | ........... | 477/181 |
| 5,408,974 A * | 4/1995 | Lipinski et al. | ........... | 123/481 |
| 5,431,139 A * | 7/1995 | Grutter et al. | ........... | 123/198 F |
| 5,437,253 A * | 8/1995 | Huffmaster et al. | ........... | 123/399 |
| 5,769,054 A * | 6/1998 | Schnaibel et al. | ........ | 123/406.47 |
| 5,884,605 A * | 3/1999 | Nagaishi et al. | ......... | 123/339.11 |
| 6,389,806 B1 * | 5/2002 | Glugla et al. | .................. | 60/284 |
| 6,499,449 B2 * | 12/2002 | Michelini et al. | .......... | 123/90.15 |
| 6,769,403 B2 * | 8/2004 | Rayl et al. | ................ | 123/406.23 |
| 7,231,907 B2 * | 6/2007 | Bolander et al. | ............... | 123/481 |
| 7,503,312 B2 * | 3/2009 | Surnilla et al. | ........... | 123/406.45 |
| 2003/0213467 A1 * | 11/2003 | Rayl et al. | ................ | 123/406.23 |
| 2009/0248278 A1 * | 10/2009 | Nakasaka | ..................... | 701/103 |
| 2010/0236521 A1 * | 9/2010 | Shiomi et al. | ............. | 123/406.23 |
| 2011/0088661 A1 * | 4/2011 | Sczomak et al. | .............. | 123/481 |
| 2011/0094475 A1 * | 4/2011 | Riegel et al. | ............. | 123/406.23 |

* cited by examiner

*Primary Examiner* — Hieu T Vo
*Assistant Examiner* — Arnold Castro
(74) *Attorney, Agent, or Firm* — Nixon & Vanderhye P.C.

(57) ABSTRACT

A method of managing a number of active cylinders of an engine can be provided. The method comprises: determining for a current engine operating condition a number of active cylinders required for the current engine operating condition; if the determined number of active cylinders is different than a current number of active cylinders, selecting one or more cylinder which is to be activated or deactivated in order to provide the determined number of active cylinders; where one or more cylinders is to be activated, retarding ignition timing for a cylinder preceding in firing order the first firing of a first activated cylinder; and where one or more cylinders is to be deactivated, advancing ignition timing for a cylinder that is not to be deactivated and which precedes in firing order a first cylinder which is to be deactivated.

26 Claims, 9 Drawing Sheets

CYLINDER DEACTIVATION EMS CONTROL

FIELD

Example embodiments of the present invention relate to a cylinder deactivation EMS control and in particular, but not exclusively, to control of cylinder deactivation and/or activation by utilizing a tunable weight of ignition retard compensation and/or by utilizing predicted valve deactivation timing and an inverse servo throttle model in order to minimise torque shock.

BACKGROUND

Some internal combustion engines, such as those with 6, 8 or even more cylinders can be designed to shut down or deactivate some cylinders during operating conditions where less than all cylinders are required to provide the instantaneous power requirements. For example, cruising at motorway/highway speed often requires only around 30% of available power while incurring significant inefficiencies through, for example, pumping losses. By deactivating one or more cylinders, the fuel consumption and engine emissions can be reduced while still providing the necessary power requirements. If more power is required, for example for acceleration or gradient climbing (e.g., hill climbing), the deactivated cylinders can be reactivated to provide the additional power. Some known approaches deactivate a single bank of cylinders within a V-configuration engine, while others deactivate selected ones of cylinders in a straight configuration engine. Such a technological approach may be called various names, including cylinder deactivation, Displacement on Demand™, Multi-Displacement System™, or Variable Cylinder Management™.

Such cylinder deactivation systems can be used in conventional internal combustion engine powered vehicles or in combination with electric hybrid vehicle power systems.

In some cylinder deactivation engine systems, a torque shock of sufficient magnitude so as to be noticeable by a vehicle occupant can occur at cylinder deactivation and/or activation events.

Example embodiments of the present invention resolve the above-noted, known disadvantages and drawbacks of known systems.

SUMMARY

Example embodiments of the present invention use one or more of a number of techniques to avoid a torque shock and/or a jump in engine speed at a cylinder deactivation or activation event.

Viewed from a first aspect, example embodiments of the present invention provide an engine management system comprising: a cylinder deactivation control that determines an engine operating condition and selects a number of active cylinders required for the determined operating condition and that indicates a cylinder which is to be deactivated in order to provide the selected number of active cylinders; and an ignition timing control that advances ignition timing for a cylinder that is not to be deactivated and which precedes in firing order a first cylinder which is to be deactivated. Thus a smoothed transition to a reduced operating mode can be provided.

In some examples, the ignition timing control uses a weighted advance to advance the ignition timing for the cylinder that is not to be deactivated and which precedes in firing order a first cylinder which is to be deactivated. This allows further smoothing of the mode transition. In some examples, the ignition timing control chooses an ignition advance weight in dependence upon one or more of current engine speed, current torque reserve, current instantaneous torque, target torque reserve and target instantaneous torque. Thus a number of factors can be taken into account when determining the amount of ignition advance.

In some examples, the cylinder deactivation control selects between two or more predetermined numbers of active cylinders. Thus a set of two or more predetermined operation modes can be used and shifted between under automatic control according to the operating conditions.

In some examples, the cylinder deactivation control further indicates a cylinder which is to be activated in order to provide the selected number of active cylinders and wherein the ignition timing control retards ignition timing for the cylinder that precedes in firing order a first cylinder that is to be activated. Thus activation or reactivation of deactivated cylinders can also be smoothed when shifting from a reduced operating mode. In some examples, the ignition timing control uses a weighted retard to retard the ignition timing for the cylinder that is to be retarded. This allows further smoothing of the mode transition. In some examples, the ignition timing control chooses an ignition retard weight in dependence upon one or more of current engine speed, current torque reserve, current instantaneous torque, target torque reserve and target instantaneous torque. Thus a number of factors can be taken into account when determining the amount of ignition retard.

In some examples, there can also be provided a throttle control that predicts the time at which the first cylinder to be deactivated will be deactivated and provides a throttle control signal to an engine throttle servo in advance of the predicted time. Thus delays and lags in the system that controls air flow into the engine can be compensated for. In some examples, the throttle control provides the throttle control signal at a time to cause the throttle to move to a required position at the predicted time. Thus the advance providing of the control signal can be tailored to provide that the effect of the control signal occurs at the most appropriate time. In some examples, the throttle control further comprises an inverse servo control that adjusts the throttle control signal to cause rapid movement of the throttle at the time that the engine throttle servo reacts to the throttle control signal. Thus transient effects which occur due to the mechanical limits and configuration of the throttle servo can be at least partially compensated for by suitable control.

In some examples, there can also be provided a throttle control that adjusts a throttle control signal to cause rapid movement of an engine throttle at the time that an engine throttle servo in receipt of the throttle control signal reacts to the throttle control signal. This allows transient effects which occur due to the mechanical and design constraints of the throttle servo to be removed or reduced when altering the throttle to adjust the air intake for a shift to a reduced operation mode.

Viewed from another aspect, example embodiments of the present invention provide an engine management unit comprising: a cylinder activation control that determines an engine operating condition and selects a number of active cylinders required for the determined operating condition and that indicates a cylinder which is to be activated in order to provide the selected number of active cylinders; and an ignition timing control that retards ignition timing for a cylinder that precedes in firing order the first cylinder that is to be activated. Thus a smoothed transition from a reduced operating mode can also be provided.

In some examples, the ignition timing control uses a weighted retard to retard the ignition timing for the first cylinder that precedes in firing order the first cylinder that is to be activated. This allows further smoothing of the mode transition. In some examples, the ignition timing control chooses an ignition retard weight in dependence upon one or more of current engine speed, current torque reserve, current instantaneous torque, target torque reserve and target instantaneous torque. Thus a number of factors can be taken into account when determining the amount of ignition retard.

In some examples, the cylinder deactivation control selects between two or more predetermined numbers of active cylinders. Thus a set of two or more predetermined operation modes can be used and shifted between under automatic control according to the operating conditions.

In some examples, the cylinder activation control further indicates a cylinder which is to be deactivated in order to provide the selected number of active cylinders and wherein the ignition timing control advances ignition timing for a cylinder that is not to be deactivated and which precedes in firing order a first cylinder which is to be deactivated. Thus a smoothed transition to a reduced operating mode can also be provided.

In some examples, there can also be provided a throttle control that predicts the time at which the first cylinder to be deactivated will be deactivated and provides a throttle control signal to an engine throttle servo in advance of the predicted time. Thus delays and lags in the system that controls air flow into the engine can be compensated for. In some examples, the throttle control provides the throttle control signal at a time to cause the throttle to move to a required position at the predicted time. Thus the advance providing of the control signal can be tailored to provide that the effect of the control signal occurs at the most appropriate time. In some examples, the throttle control further comprises an inverse servo control that adjusts the throttle control signal to cause rapid movement of the throttle at the time that the engine throttle servo reacts to the throttle control signal. Thus transient effects which occur due to the mechanical limits and configuration of the throttle servo can be at least partially compensated for by suitable control.

In some examples, there can also be provided a throttle control that adjusts a throttle control signal to cause rapid movement of an engine throttle at the time that an engine throttle servo in receipt of the throttle control signal reacts to the throttle control signal. This allows transient effects which occur due to the mechanical and design constraints of the throttle servo to be removed or reduced when altering the throttle to adjust the air intake for a shift to a reduced operation mode.

Viewed from a further aspect, example embodiments of the present invention provide a method of managing a number of active cylinders of an engine, the method comprising: determining for a current engine operating condition a number of active cylinders required for the current engine operating condition; if the determined number of active cylinders is different than a current number of active cylinders, selecting one or more cylinder which is to be activated or deactivated in order to provide the determined number of active cylinders; where one or more cylinders is to be activated, retarding ignition timing for the firing of a cylinder that precedes in firing order a first activated cylinder; and where one or more cylinders is to be deactivated, advancing ignition timing for a cylinder that is not to be deactivated and which precedes in firing order a first cylinder which is to be deactivated. Thereby smoothed transitions to and from reduced operation modes can be provided.

Viewed from another aspect, example embodiments of the present invention provide a method of managing a number of active cylinders of an engine, the method comprising: determining for a current engine operating condition a number of active cylinders required for the current engine operating condition; if the determined number of active cylinders is greater than a current number of active cylinders, selecting one or more cylinder which is to be deactivated in order to provide the determined number of active cylinders; and advancing ignition timing for a cylinder that is not to be deactivated and which precedes in firing order a first cylinder which is to be deactivated. Thus a smoothed transition to a reduced operating mode can be provided.

In some examples, the method further comprises applying a weight to the advancing of the ignition timing for the cylinder that is not to be deactivated and which precedes in firing order a first cylinder which is to be deactivated. This allows further smoothing of the mode transition. In some examples, the applying further comprises selecting the weight for the weighted ignition timing advance in dependence upon one or more of current engine speed, current torque reserve, current instantaneous torque, target torque reserve and target instantaneous torque. Thus a number of factors can be taken into account when determining the amount of ignition advance.

In some examples, the determining comprises selecting between two or more predetermined numbers of active cylinders. Thus a set of two or more predetermined operation modes can be used and shifted between under automatic control according to the operating conditions.

In some examples, the method further comprises: if the determined number of active cylinders is less than a current number of active cylinders, selecting one or more cylinders which is to be activated in order to provide the determined number of active cylinders; and retarding ignition timing for the firing of the cylinder preceding in firing order a first activated cylinder. Thus a smoothed transition from a reduced operating mode can also be provided.

In some examples, the method further comprises applying a weight to the retarding of the ignition timing for the cylinder that is to be retarded. This allows further smoothing of the mode transition. In some examples, the method further comprises selecting the weight for the weighted ignition timing retard in dependence upon one or more of current engine speed, current torque reserve, current instantaneous torque, target torque reserve and target instantaneous torque. Thus a number of factors can be taken into account when determining the amount of ignition retard.

In some examples, the method further comprises predicting the time at which the first cylinder to be deactivated will be deactivated and providing a throttle control signal to an engine throttle servo in advance of the predicted time. Thus delays and lags in the system that controls air flow into the engine can be compensated for. In some examples, the providing the throttle control signal comprises timing the throttle control signal at a time to cause the throttle to move to a required position at the predicted time. Thus the advance providing of the control signal can be tailored to provide that the effect of the control signal occurs at the most appropriate time. In some examples, the method further comprises applying an inverse servo control to adjust the throttle control signal to cause rapid movement of the throttle at the time that the engine throttle servo reacts to the throttle control signal. Thus transient effects which occur due to the mechanical limits and configuration of the throttle servo can be at least partially compensated for by suitable control.

In some examples, the method can further comprise adjusting a throttle control signal to cause rapid movement of an engine throttle at the time that an engine throttle servo in receipt of the throttle control signal reacts to the throttle control signal. This allows transient effects which occur due to the mechanical and design constraints of the throttle servo to be removed or reduced when altering the throttle to adjust the air intake for a shift to a reduced operation mode.

Viewed from a further aspect, example embodiments of the present invention provide a method of managing a number of active cylinders of an engine, the method comprising: determining for a current engine operating condition a number of active cylinders required for the current engine operating condition; if the determined number of active cylinders is less than a current number of active cylinders, selecting one or more cylinder which is to be activated in order to provide the determined number of active cylinders; and retarding ignition timing for the firing of a cylinder that precedes in firing order a first activated cylinder. Thus a smoothed transition from a reduced operating mode can also be provided.

In some examples, the method further comprises applying a weight to the retarding of the ignition timing for the cylinder that is to be retarded. This allows further smoothing of the mode transition. In some examples, the method further comprises selecting the weight for the weighted ignition retarding in dependence upon one or more of current engine speed, current torque reserve, current instantaneous torque, target torque reserve and target instantaneous torque. Thus a number of factors can be taken into account when determining the amount of ignition retard.

In some examples, wherein the determining comprises selecting between two or more predetermined numbers of active cylinders. Thus a set of two or more predetermined operation modes can be used and shifted between under automatic control according to the operating conditions.

In some examples, the method further comprises, if the determined number of active cylinders is greater than a current number of active cylinders, selecting one or more cylinders which is to be deactivated in order to provide the determined number of active cylinders; and advancing ignition timing for a cylinder that is not to be deactivated and which precedes in firing order a first cylinder which is to be deactivated. Thus a smoothed transition to a reduced operating mode can also be provided.

In some examples, the method further comprises applying a weight to the advancing of the ignition timing for the cylinder that is not to be deactivated and which precedes in firing order a first cylinder which is to be deactivated. This allows further smoothing of the mode transition.

In some examples, the method further comprises predicting the time at which the first cylinder to be activated will be activated and providing a throttle control signal to an engine throttle servo in advance of the predicted time. Thus delays and lags in the system that controls air flow into the engine can be compensated for. In some examples, the providing the throttle control signal comprises timing the throttle control signal at a time to cause the throttle to move to a required position at the predicted time. Thus the advance providing of the control signal can be tailored to provide that the effect of the control signal occurs at the most appropriate time. In some examples, the method further comprises applying an inverse servo control to adjust the throttle control signal to cause rapid movement of the throttle at the time that the engine throttle servo reacts to the throttle control signal. Thus transient effects which occur due to the mechanical limits and configuration of the throttle servo can be at least partially compensated for by suitable control.

In some examples, the method can further comprise adjusting a throttle control signal to cause rapid movement of an engine throttle at the time that an engine throttle servo in receipt of the throttle control signal reacts to the throttle control signal. This allows transient effects which occur due to the mechanical and design constraints of the throttle servo to be removed or reduced when altering the throttle to adjust the air intake for a shift to a reduced operation mode.

Viewed from a further aspect, example embodiments of the present invention provide an engine management system comprising: a cylinder activity control that determines an engine operating condition and selects a number of active cylinders required for the determined operating condition and that indicates a cylinder which is to be activated or deactivated in order to provide the selected number of active cylinders; and an ignition timing control that, when a cylinder is to be activated to provide the selected number of active cylinders, retards ignition timing for a cylinder that precedes in firing order a cylinder that is to be activated, and when a cylinder is to be deactivated to provide the selected number of active cylinders, advances ignition timing for a cylinder that is not to be deactivated and which precedes in firing order a first cylinder which is to be deactivated. Thus smooth shifts to and from reduced operation modes can be achieved.

In some examples, the ignition timing control applies a weight to the ignition timing advance or retard. This provides for further smoothing of the transition. In some examples, the weight is selected in dependence upon one or more of current engine speed, current torque reserve, current instantaneous torque, target torque reserve and target instantaneous torque. Thus a number of factors can be taken into account when determining the amount of ignition advance or retard In some examples, the engine management system further comprises: a manifold flow control that issues a throttle control signal to a throttle servo that controls movement of a throttle valve that adjusts a flow rate into an engine intake manifold; wherein the manifold flow control receives an input representative of a predicted cylinder activation or deactivation timing and adjusts the throttle control signal responsive to the predicted timing by issuing, prior to the predicted deactivation timing, an adjusted throttle control signal to instruct the throttle servo to move the throttle valve to a position required after the cylinder activation or deactivation. Thus further smoothing can be achieved by compensating for delays and lags in the system that controls air flow into the engine.

In some examples, the movement of the throttle valve under control of the throttle servo occurs after a throttle delay from receipt of a throttle control signal from the manifold flow control, and wherein the adjusted throttle control signal issued prior to the predicted timing is issued at a time advance prior to the predicted timing which time advance is approximately equal to the throttle delay. Thus the throttle control advance can be set to compensate for the throttle delay inherent in the throttle systems.

In some examples, the movement of the throttle valve under control of the throttle servo occurs after a throttle delay from receipt of a throttle control signal from the manifold flow control, and wherein the adjusted throttle control signal issued prior to the predicted timing is issued at a time advance prior to the predicted timing which time advance is approximately equal to between 100% and 120% of the throttle delay. Thus the throttle control advance can be set to compensate for the throttle delay inherent in the throttle systems and to allow for transient effects in the throttle systems that may cause the throttle valve to transition gradually to the desired position.

In some examples, the manifold flow control further comprises an inverse servo control that operates to adjust the throttle control signal to compensate for mechanical properties of the throttle servo that cause transient effects in movement of the throttle valve under control of the throttle servo. Thus the servo's properties can be at least partially reversed when required so as to provide rapid movement between throttle positions appropriate to before and after an engine mode shift.

In some examples, the inverse servo control is operative responsive to an input representative of a predicted cylinder activation or deactivation timing to adjust the throttle control signal. Thus the inverse servo control can be turned off at times when a smooth movement of throttle is appropriate, but can be turned on to achieve rapid throttle valve position adjustment when required as part of an engine mode shift.

In some examples, the inverse servo control operates to adjust the throttle control signal by initially specifying in the throttle control signal a throttle valve position that is beyond the required position and subsequently adjusting the throttle control signal back to specifying the required position. By initially specifying an over-large adjustment amount, the throttle servo is caused to provide a more rapid movement of the throttle valve over the distance of throttle valve adjustment that is actually required, and by subsequently specifying the throttle adjustment to be closer to the actual required position, the throttle valve has not had time to reach the over-compensated position initially specified by the time that the control signal changes, such that the effect is a rapid transition to the required value while avoiding overshoot in terms of achieved throttle angle.

In some examples, the engine management system further comprises a manifold flow control that issues a throttle control signal to a throttle servo that controls movement of a throttle valve that adjusts a flow rate into an engine intake manifold and wherein the manifold flow control further comprises an inverse servo control that operates to adjust the throttle control signal to compensate for mechanical properties of the throttle servo that cause transient effects in movement of the throttle valve under control of the throttle servo. Thus the servo's properties can be at least partially reversed when required so as to provide rapid movement between throttle positions appropriate to before and after an engine mode shift.

In some examples, the inverse servo control is operative responsive to an input representative of a predicted cylinder activation or deactivation timing to adjust the throttle control signal. Thus the inverse servo control can be turned off at times when a smooth movement of throttle is appropriate, but can be turned on to achieve rapid throttle valve position adjustment when required as part of an engine mode shift.

In some examples, the inverse servo control operates to adjust the throttle control signal by initially specifying in the throttle control signal a throttle valve position that is beyond the required position and subsequently adjusting the throttle control signal back to specifying the required position. By initially specifying an over-large adjustment amount, the throttle servo is caused to provide a more rapid movement of the throttle valve over the distance of throttle valve adjustment that is actually required, and by subsequently specifying the throttle adjustment to be closer to the actual required position, the throttle valve has not had time to reach the over-compensated position initially specified by the time that the control signal changes, such that the effect is a rapid transition to the required value while avoiding overshoot in terms of achieved throttle angle.

Viewed from a further aspect, example embodiments of the present invention provide an engine management system comprising: a manifold flow control that issues a throttle control signal to a throttle servo that controls movement of a throttle valve that adjusts a flow rate into an engine intake manifold; wherein the manifold flow control receives an input representative of a predicted cylinder activation or deactivation timing and adjusts the throttle control signal responsive to the predicted timing by issuing, prior to the predicted deactivation timing, an adjusted throttle control signal to instruct the throttle servo to move the throttle valve to a position required after the cylinder activation or deactivation. Thus a smooth mode transition can be effected by compensating in the control system for delays in the physical systems that control the throttle position.

In some examples, the movement of the throttle valve under control of the throttle servo occurs after a throttle delay from receipt of a throttle control signal from the manifold flow control, and wherein the adjusted throttle control signal issued prior to the predicted timing is issued at a time advance prior to the predicted timing which time advance is approximately equal to the throttle delay. Thus the mechanical delays can be substantially cancelled by appropriately timed control signals.

In some examples, the movement of the throttle valve under control of the throttle servo occurs after a throttle delay from receipt of a throttle control signal from the manifold flow control, and wherein the adjusted throttle control signal issued prior to the predicted timing is issued at a time advance prior to the predicted timing which time advance is approximately equal to between 100% and 120% of the throttle delay. Thus the advance control signal can compensate for transient effects as the throttle valve opens over time as well as the mechanical delays in commencing the movement of the throttle valve.

In some examples, the manifold flow control further comprises an inverse servo control that operates to adjust the throttle control signal to compensate for mechanical properties of the throttle servo that cause transient effects in movement of the throttle valve under control of the throttle servo. Thus the transient effects of the mechanical movement of the throttle valve by the throttle servo can be reduced so as to effect a smooth shift between modes.

In some examples, the inverse servo control is operative responsive to an input representative of a predicted cylinder activation or deactivation timing to adjust the throttle control signal. Thus the inverse servo control can be turned off at times when a smooth movement of throttle is appropriate, but can be turned on to achieve rapid throttle valve position adjustment when required as part of an engine mode shift.

In some examples, the inverse servo control operates to adjust the throttle control signal by initially specifying in the throttle control signal a throttle valve position that is beyond the required position and subsequently adjusting the throttle control signal back to specifying the required position. By initially specifying an over-large adjustment amount, the throttle servo is caused to provide a more rapid movement of the throttle valve over the distance of throttle valve adjustment that is actually required, and by subsequently specifying the throttle adjustment to be closer to the actual required position, the throttle valve has not had time to reach the over-compensated position initially specified by the time that the control signal changes, such that the effect is a rapid transition to the required value while avoiding overshoot in terms of achieved throttle angle.

Viewed from another aspect, example embodiments of the present invention provide an engine management system comprising: a manifold flow control that issues a throttle control signal to a throttle servo that controls movement of a throttle valve that adjusts a flow rate into an engine intake manifold; wherein the manifold flow control comprises an inverse servo control that operates to adjust the throttle control signal to compensate for mechanical properties of the throttle servo that cause transient effects in movement of the throttle valve under control of the throttle servo. Thus the transient effects of the mechanical movement of the throttle valve by the throttle servo can be reduced so as to effect a smooth shift between modes.

In some examples, the inverse servo control is operative responsive to an input representative of a predicted cylinder activation or deactivation timing to adjust the throttle control signal. Thus the inverse servo control can be turned off at times when a smooth movement of throttle is appropriate, but can be turned on to achieve rapid throttle valve position adjustment when required as part of an engine mode shift.

In some examples, the inverse servo control operates to adjust the throttle control signal by initially specifying in the throttle control signal a throttle valve position that is beyond the required position and subsequently adjusting the throttle control signal back to specifying the required position. By initially specifying an over-large adjustment amount, the throttle servo is caused to provide a more rapid movement of the throttle valve over the distance of throttle valve adjustment that is actually required, and by subsequently specifying the throttle adjustment to be closer to the actual required position, the throttle valve has not had time to reach the over-compensated position initially specified by the time that the control signal changes, such that the effect is a rapid transition to the required value while avoiding overshoot in terms of achieved throttle angle.

Viewed from a further aspect, example embodiments of the present invention provide a method of managing flow of air through an engine intake manifold, the method comprising: predicting when a cylinder activation or deactivation is going to occur; and adjusting a throttle control signal responsive to the predicted timing by issuing, prior to the predicted deactivation timing, an adjusted throttle control signal to instruct a throttle servo to move a throttle valve to a position required after the cylinder activation or deactivation. Thus a smooth mode transition can be effected by compensating in the control system for delays in the physical systems that control the throttle position.

In some examples, the movement of the throttle valve under control of the throttle servo occurs after a throttle delay from receipt of a throttle control signal from the manifold flow control, and wherein the adjusting causes the adjusted throttle control signal issued prior to the predicted timing is issued at a time advance prior to the predicted timing which time advance to be approximately equal to the throttle delay. Thus the mechanical delays can be substantially cancelled by appropriately timed control signals.

In some examples, the movement of the throttle valve under control of the throttle servo occurs after a throttle delay from receipt of a throttle control signal from the manifold flow control, and wherein the adjusting causes adjusted throttle control signal issued prior to the predicted timing to be issued at a time advance prior to the predicted timing which time advance is approximately equal to between 100% and 120% of the throttle delay. Thus the advance control signal can compensate for transient effects as the throttle valve opens over time as well as the mechanical delays in commencing the movement of the throttle valve.

In some examples, the method further comprises further adjusting the throttle control signal by applying an inverse servo control to compensate for mechanical properties of the throttle servo that cause transient effects in movement of the throttle valve under control of the throttle servo. Thus the transient effects of the mechanical movement of the throttle valve by the throttle servo can be reduced so as to effect a smooth shift between modes.

In some examples, the applying the inverse servo control is responsive to an input representative of a predicted cylinder activation or deactivation timing to adjust the throttle control signal. Thus the inverse servo control can be turned off at times when a smooth movement of throttle is appropriate, but can be turned on to achieve rapid throttle valve position adjustment when required as part of an engine mode shift.

In some examples, the applying an inverse servo control comprises adjusting the throttle control signal by initially specifying in the throttle control signal a throttle valve position that is beyond the required position and subsequently adjusting the throttle control signal back to specifying the required position. By initially specifying an over-large adjustment amount, the throttle servo is caused to provide a more rapid movement of the throttle valve over the distance of throttle valve adjustment that is actually required, and by subsequently specifying the throttle adjustment to be closer to the actual required position, the throttle valve has not had time to reach the over-compensated position initially specified by the time that the control signal changes, such that the effect is a rapid transition to the required value while avoiding overshoot in terms of achieved throttle angle.

Viewed from another aspect, example embodiments of the present invention provide a method of managing flow of air through an engine intake manifold, the method comprising: adjusting a throttle control signal by applying an inverse servo control to compensate for mechanical properties of a throttle servo that cause transient effects in movement of a throttle valve under control of the throttle servo. Thus the transient effects of the mechanical movement of the throttle valve by the throttle servo can be reduced so as to effect a smooth shift between modes.

In some examples, the applying the inverse servo control is responsive to an input representative of a predicted cylinder activation or deactivation timing to adjust the throttle control signal. Thus the inverse servo control can be turned off at times when a smooth movement of throttle is appropriate, but can be turned on to achieve rapid throttle valve position adjustment when required as part of an engine mode shift.

In some examples, the applying an inverse servo control comprises adjusting the throttle control signal by initially specifying in the throttle control signal a throttle valve position that is beyond the required position and subsequently adjusting the throttle control signal back to specifying the required position. By initially specifying an over-large adjustment amount, the throttle servo is caused to provide a more rapid movement of the throttle valve over the distance of throttle valve adjustment that is actually required, and by subsequently specifying the throttle adjustment to be closer to the actual required position, the throttle valve has not had time to reach the over-compensated position initially specified by the time that the control signal changes, such that the effect is a rapid transition to the required value while avoiding overshoot in terms of achieved throttle angle.

Viewed from another aspect, example embodiments of the present invention provide an engine management unit that carries out ignition timing advance or retard for a cylinder deactivation or activation event and carries out throttle control by cylinder deactivation or activation prediction and carries out throttle control by inverse servo control.

Example embodiments of the present invention also provide an engine powered vehicle incorporating any of the engine management units or engine management systems, or implementing any of the methods set out above. The vehicle may be, for example, a car, jeep, truck, lorry, bus, straddle type vehicle (motorbike, scooter etc), or an armoured vehicle (APC, AFV, MBT etc). Additionally, the vehicle may be a non-land vehicle powered by an engine, such as a piston engine powered aircraft, or a marine craft such as a boat, hydrofoil or hovercraft.

Further aspects and embodiments of the invention will become clear from the following detailed description and accompanying figures, and from the claims.

BRIEF DESCRIPTION OF THE FIGURES

Specific, non-limiting, example embodiments of the present invention will now be described by way of example only with reference to the accompanying figures in which.

DETAILED DESCRIPTION OF EXAMPLE EMBODIMENTS

Figure 1:
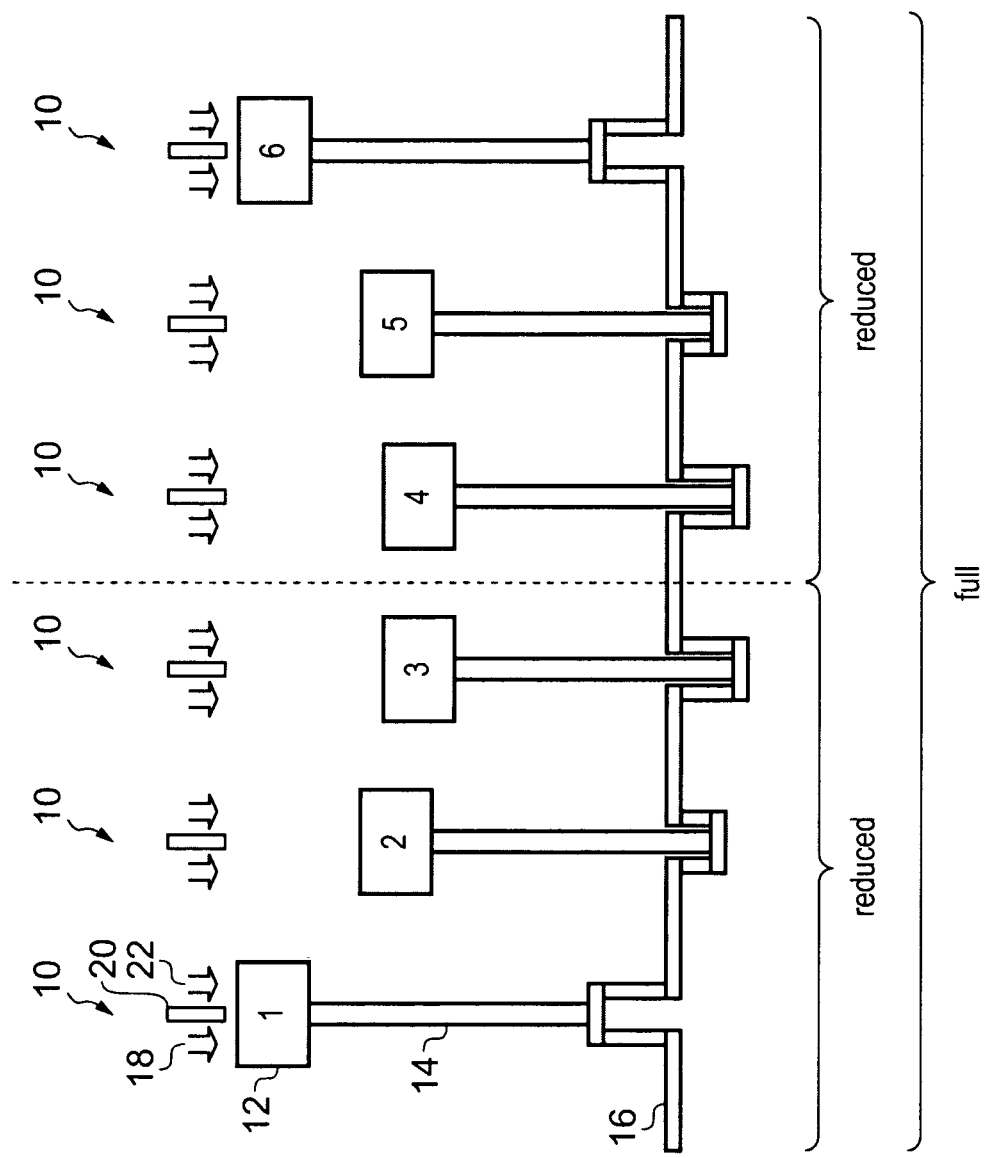
FIG. 1 shows schematically an internal combustion engine with a number of cylinders.

As shown schematically in FIG. 1, an internal combustion engine may have a number of cylinders 10. FIG. 1 depicts each cylinder by way of a piston 12 connected to an associated connecting rod 14 and thereby to the engine crankshaft 16. Each cylinder is also shown as having an intake valve 18, a spark plug 20 and an outlet valve 22. Each cylinder is connected to the same crankshaft 16. For simplicity, other features such as the engine block, cylinder bores, piston rings, further valves and inlet/outlet manifold are not shown.

The engine shown in FIG. 1 has a six cylinder straight-6 configuration utilising a 1 5 3 6 2 4 firing order and, in the present examples, is configured to operate in two modes—a full operation mode with all six cylinders active and a reduced operation mode with only three cylinders active. As shown in FIG. 1, in the reduced mode, alternate cylinders are deactivated such that either cylinders 1, 2, 3 remain in operation or cylinders 4, 5, 6 remain in operation.

Although the present examples use a straight-6 engine configured to use either 6 or 3 cylinders, such a straight 6 engine could have a larger number of operation modes, including for example, 6 4 and 3 cylinder modes. Also, other engine configurations could be used, such as straight configuration engines having a different firing order and/or number of cylinders and/or V- H- W- or flat-configuration engines (where a reduced mode might involve deactivating one bank of cylinders).

Figure 2:
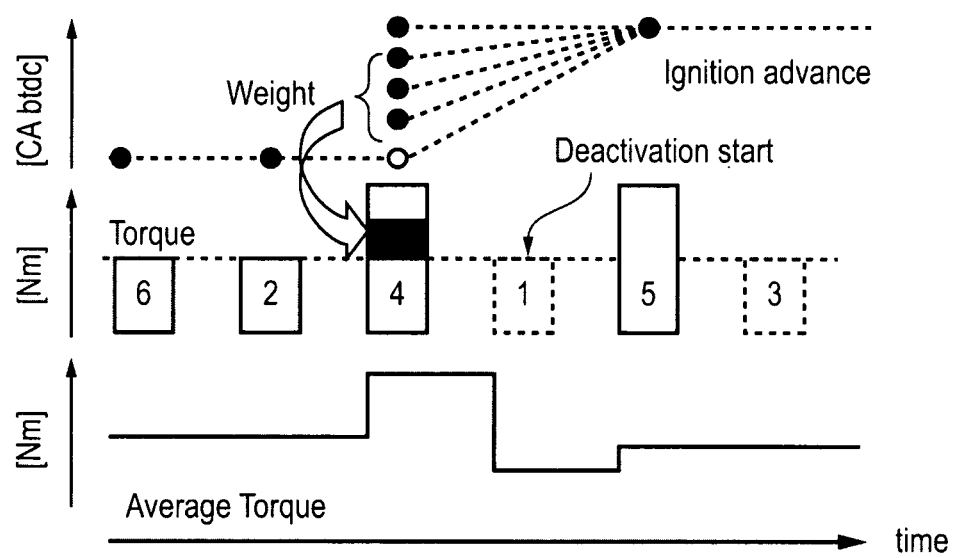
FIG. 2 shows an illustration of an example of an approach for providing a smooth transition from a full operation mode to reduced operation mode.

Considering now FIG. 2, there can be seen an illustration of first example of an approach for providing a smooth transition from a full operation mode to reduced operation mode using only cylinders 4, 5 and 6. In this example, the ignition timing of the last cylinder to fire before the first non-firing of the first deactivated cylinder is adjusted to provide a smooth transition from one mode to the other.

As is shown in FIG. 2, cylinders 6, 2 and 5 are fired in normal sequence during the full mode operation and cylinder 1 is the first cylinder to be not fired in the shift to reduced mode operation. As can also be seen, during full mode operation, all cylinders are fired at an ignition timing which results in a given torque production per cylinder firing and produces a given level of average torque from the engine. Prior to the commencement of a shift process, the ignition timing is typically MBT (Maximum Brake Torque timing) such that the torque efficiency of the engine is as close to the maximum as possible. At the start of the shift process, shortly before the actual cylinder deactivations, torque reserve is built up, meaning that the requested torque is doubled for air control purposes while the requested torque is kept at the previous level for ignition control purposes. This has the result that when the throttle opens to admit more air, the ignition gradually retards to keep the torque the same. In the present example, the torque reserve is built up until the ignition efficiency is approximately 50% (which is approximately 50% MBT) although in alternative arrangements a different ignition efficiency level may be appropriate During the shift to reduced mode, the remaining active cylinders are then fired at an ignition timing which results in a higher given torque production per cylinder firing to produce the same given level of average torque from the engine. In the present example, the ignition is advanced while keeping the throttle at the same doubled air position in order to achieving timing at or around MBT, thereby re-increasing the torque efficiency back toward the maximum and achieving the increased torque production. By this approach of attempting to produce the same average torque both before and during the shift, a large transition in produced engine torque at the time of the shift is avoided. Once the deactivation event has completed, the engine can be controlled using both ignition control and throttle control to whatever power and torque production is required by the driving conditions.

The appropriate level of torque reserve to build up for the shift is related to the proportional reduction in the number of cylinders. Thus although the present example is described as requiring a torque reserve which causes timing to retard to achieve approximately 50%, this is connected to the 50% reduction in the number of cylinders in the present example. If the number of cylinders is to be reduced by a different proportion, the appropriate amount of torque reserve to build up will be dependent upon that proportional reduction in number of cylinders.

In the present example, cylinder no. 4 is the last cylinder to fire before the first non-firing cylinder (no. 1) at the shift from full to reduced mode. According to the present example, the ignition timing of this last firing cylinder before the shift can be advanced to increase the torque produced by that cylinder cycle, thereby countering the non-production of torque on the first non-firing cylinder. Thus, although there is a discontinuity in the value of average torque produced by the engine, the discontinuity is much smaller than that which would occur if no transition management were applied on the shift from full to reduced operation mode. Accordingly, use of such weighted ignition timing advance can reduce or ameliorate a torque shock which would occur if the engine moved directly from the full mode to the reduced mode.

Figure 3:
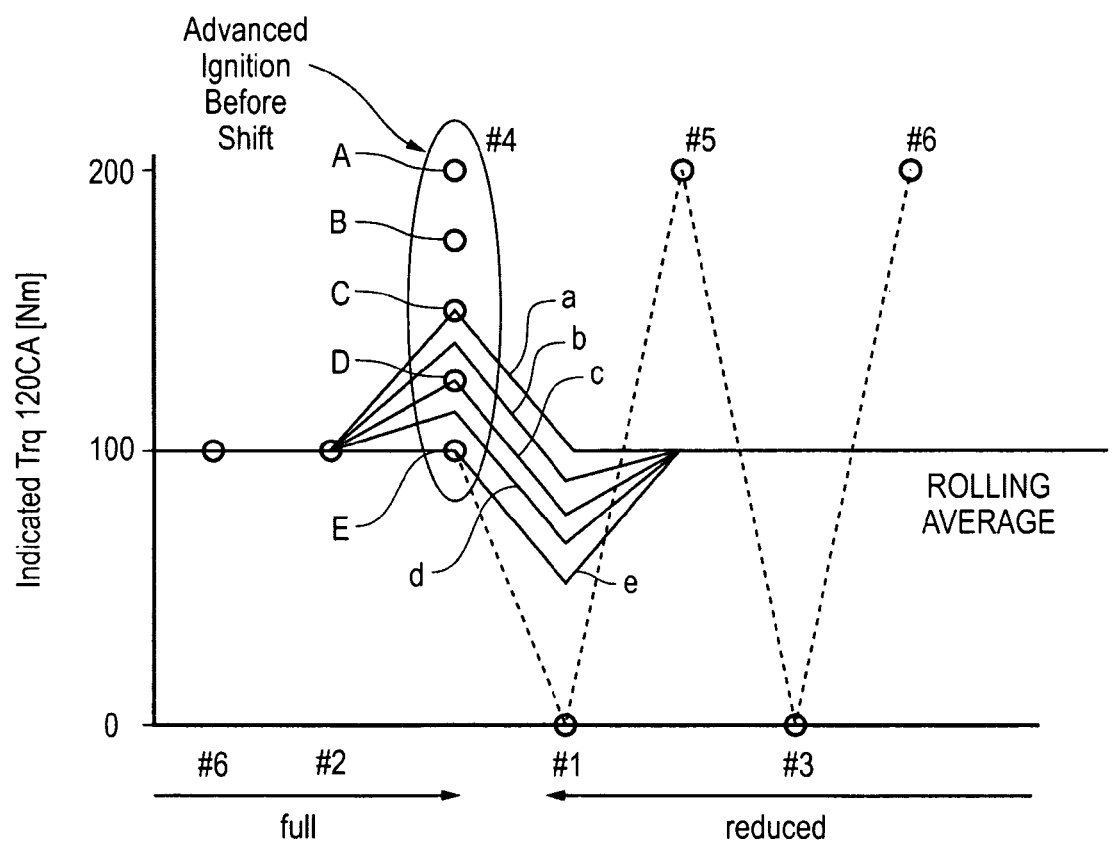
FIG. 3 illustrates rolling average torque under four different levels of ignition advance and for a non-advance situation.

FIG. 3 illustrates the rolling average torque under four different levels of ignition advance, and for the non-advance situation for comparative purposes. This graph shows indicated Torque generated from each combustion and the generated rolling average torque (the rolling average is based upon the preceding 120° of crank angle. Thus, in the present example, the rolling average both before and after the shift from full mode to reduced mode is 100 Nm and the torque at the time of the shift varies according to the ignition advance applied to the last firing cylinder in full mode. The graph of FIG. 3 shows the torque curve for 4 different amounts of ignition advance and the curve for no advance. The amount of advance is relative to the ignition advance applied to the first cylinder fired after the shift, as illustrated and discussed with reference to FIG. 2 above. Thus zero advance is no advance and advance of 1 is an advance equal to the advance applied to the first fired cylinder after the shift.

In FIG. 3, point A illustrates average torque generated by an ignition advance of 1 (i.e. 100% weighting) and the line marked "a" is the rolling average torque line for this level of advance. Similarly, points B, C and D correspond to average torque lines b, c and d, and represent ignition advance of 0.75 (75% weighting), 0.5 (50% weighting) and 0.25 (25% weighting) respectively, these weightings correspond to % torque efficiency rather than to a relative crank angle. Thus in the example of FIG. 3 where a 1.0 (100%) weighting represents an increase of 100 Nm, the advance to achieve the 0.25 weighting is not 25% of the crank angle needed to achieve the 100 Nm increase, but rather is the crank angle required to achieve a 25 Nm (25% of 100 Nm) increase. Point E and corresponding line e represent zero advance. As will be appreciated, the absolute torque values generated are not fixed at those depicted in the figure and can be varied between different engines types/models, between different instances of the same engine type/model and for different operating conditions of a single engine.

Figure 4:
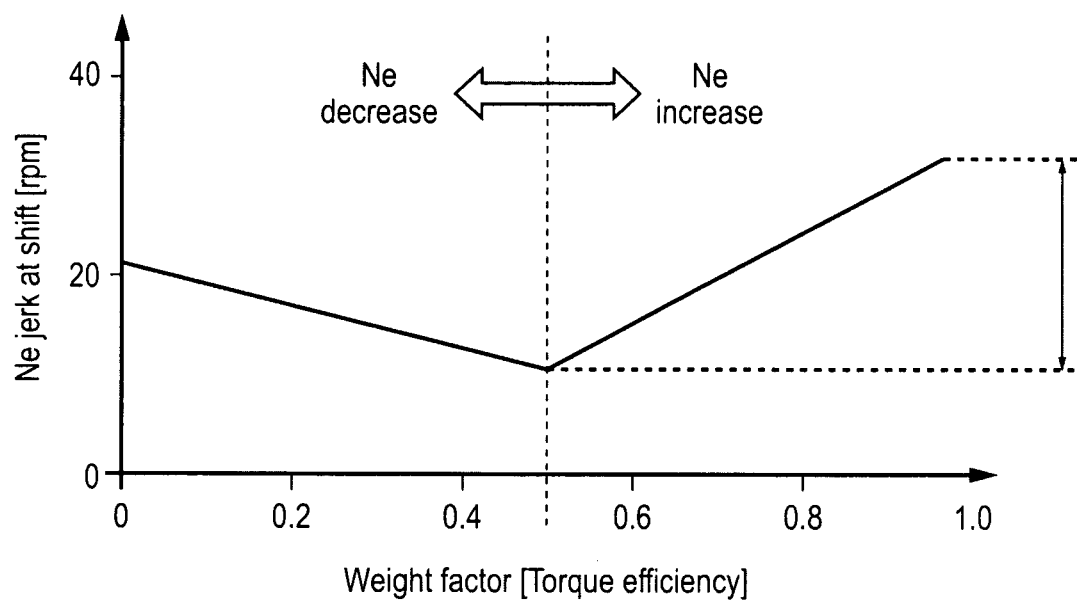
FIG. 4 illustrates the effect of the fluctuations in torque at the time of mode shift on engine speed.

The effect of the fluctuations in torque at the time of shift on engine speed is illustrated in FIG. 4. The line shown in FIG. 4 is representative of actually occurring jerk. There will in fact be a tendency for both a positive and a negative rpm jerk created by a shift, but for any given weight factor one of these tendencies will outweigh the other such that an actually occurring jerk in one direction or the other would be expected. In this example, the engine had a speed prior to the shift of 2500 rpm. As can be in FIG. 4, if no ignition advance is applied to the last fired cylinder before shift (weight factor 0), then in this example the engine speed exhibits a jerk of around a 20 rpm reduction in engine speed. If 100% ignition advance (weight factor 1) is applied, the engine speed exhibits a jerk of around a 3-rpm increase in engine speed. As can be seen from FIG. 4, in this example the smallest jerk is achieved when the weight factor is close to 0.5.

The exact speed and torque values will vary between different engines and engine setup figures. For example, otherwise identical engines can be configured to shift modes at a different starting rpm and torque values. Also, different engines may have different torque production curves, necessitating different absolute values for the amount of applied ignition advance. Also, the exact ignition advance weight to produce the smoothest torque transition curve and/or the smallest engine speed jerk will vary between different engines and engine setup arrangements.

The skilled reader will thus now appreciate that a torque shock and/or an engine speed jerk at the time of shifting from a full mode to a reduced mode or from a first reduced to a further reduced mode can be reduced by adjusting the ignition timing of the last cylinder to be fired before the shift.

Figure 5:
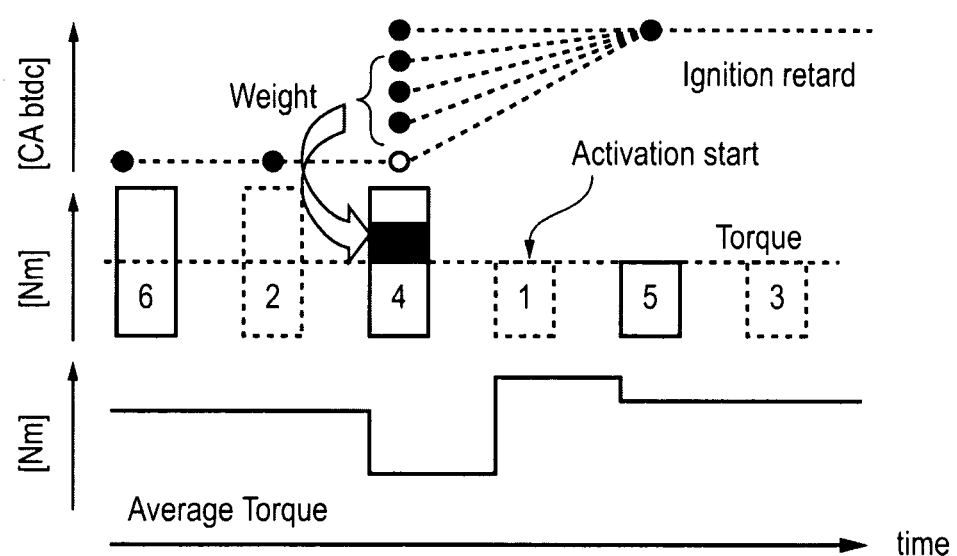
FIG. 5 shows an illustration of an example of an approach for providing a smooth transition from a reduced operation mode to full operation mode.

A corresponding approach can be taken at the time of shifting from reduced mode to full mode (or from a more reduced mode to a less reduced mode) of operation. This is illustrated in FIG. 5. In the Example of FIG. 5, the first cylinder to be fired under the full mode of operation is cylinder 1. As is shown in FIG. 5, cylinder 6 is fired in normal sequence in reduced mode, then cylinder 2 is not fired (also standard for reduced mode), cylinder 4 is fired, but as this is the last cylinder firing in the reduced mode the firing is performed with an ignition retard. Cylinders 1, 5 and 3 are then fired as normal for full mode of operation. As can also be seen, during reduced mode operation, all cylinders are fired at an ignition timing which results in a given torque production per cylinder firing and produces a given level of average torque from the engine. Typically this ignition timing is MBT (Minimal advance for Best Torque) such that the torque efficiency of the engine is as close to the maximum as possible, however in alternative arrangements this may be adjusted prior to the shift such that the after shift ignition timing can be at MBT or a combination approach may be taken where neither the before or after timing is MBT but instead MBT is between the two timings used. During the shift to full mode, the active cylinders are fired at an ignition timing relative to the timing that will be employed in full mode which results in a higher given torque production per cylinder firing in reduced mode than in full mode to produce the same given level of average torque from the engine. In the present example where reduced mode uses half of the total number of cylinders, the ignition timing is set to produce half as much torque per cylinder in full mode as in reduced mode. By producing the same average torque both before and during the shift, a large transition in produced engine torque at the time of the shift is avoided. Once the reactivation event has completed, the timing for each cylinder can be gradually adjusted to be close to MBT, such that the engine torque efficiency increases. The total engine torque can be controlled in accordance with operator or automatic (for example cruise control) control.

Thus it will be understood that a torque shock at the shift between modes in a cylinder deactivation engine can be reduced by altering the ignition timing of a cylinder adjacent in firing order to the first or last cylinder to be not fired in a reduced cylinders operation mode.

A number of other techniques for transition management when shifting between operation modes in a cylinder deactivation engine can be implemented with, or instead of, the above described approach.

One such additional approach relates to issues associated with the change in flow of gasses into and out of the engine when deactivating or activating a number of cylinders.

When a bank or group of cylinders are suddenly stopped from operating, such as when a cylinder deactivation technique is applied to an engine, a torque shock and/or engine speed shock can occur due to pressure imbalances in the air intake and/or outflow paths. The processes whereby this can occur are illustrated with respect to FIG. 6.

Figure 6:
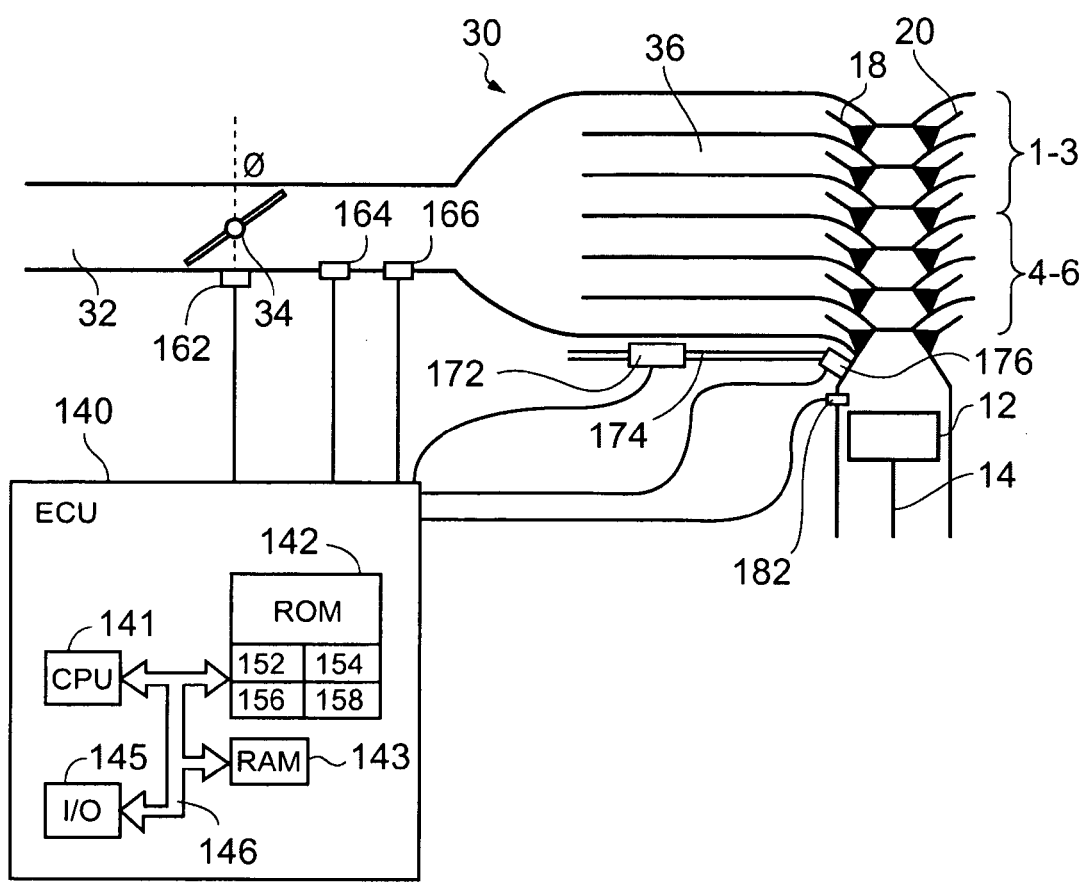
FIG. 6 shows schematically an engine system including an internal combustion engine and an engine control unit (ECU)

The sudden closure of valves on three cylinders of a six cylinder engine, such as that illustrated in FIG. 1 can cause a sudden increase in pressure in the intake manifold due to the decrease in amount of air exiting the manifold through the cylinders. An intake manifold is generally illustrated 30 in FIG. 6 and leads an intake flow of air from an intake pipe 32 past a throttle valve 34 to individual cylinder feed pipes 36 which lead to the intake valve 18 of each cylinder. The exact air path through the manifold can vary from engine to engine, but typically an intake manifold is configured to provide even air pressure to the intake valve(s) of each cylinder. Under normal engine operating conditions a vacuum exists within the intake manifold, which serves automatically to draw air into the manifold through the throttle 30, which controls the amount of air passing into the manifold. In some engines, the fuel is injected into the air within the manifold (indirect injection). In some other engines, the fuel is injected into the air within the cylinder (direct injection), as illustrated for example by FIG. 6 showing fuel being directly injected in a cylinder by a fuel injector 176 via a fuel line 174 and fuel pressure regulator 172. In the present example, the discussion will refer to air in the manifold but it will be understood that for an indirect injection arrangement at least some parts of the manifold will hold a fuel/air mixture.

FIG. 6 thus provides a partial schematic overview of an engine system including an internal combustion engine and an engine control unit (ECU) 140. The engine system is controlled by an engine management system that includes the engine control unit (ECU) 140 and various sensors and control subsystems of the engine system to which the ECU 140 is connected. The ECU 140 may include a central processing unit (CPU) 141 for executing programmed logic (thereby forming programmed logic circuitry); a ROM 142 for storing control data and control programs (programmed logic) such as ignition timing control logic 152, cylinder activation control logic 154, cylinder deactivation control logic 156 and throttle control logic 158; a RAM 143 for storing various data and/or programmed logic; an input/output circuit 145 for communicating data signals to/from devices such as a throttle angle sensor 162, a pressure sensor 164 and a temperature sensor 166; and a bus line 146. The CPU 141 of the ECU 140 executes, for example, the procedure of the programmed ignition timing control logic 152, cylinder activation control logic 154, cylinder deactivation control logic 156 and throttle control logic 158, thereby forming programmed logic circuitry of an ignition timing controller, a cylinder activation controller, a cylinder deactivation controller and throttle controller.

The pressure sensor 164 in the intake manifold 30 provides control signals to the ECU 140. The fuel injector 176 for the cylinder is connected to the fuel supply line 174. As noted above, in FIG. 6, the fuel injector 176 is represented as a direct fuel injector that injects fuel directly into each cylinder, but in other examples, the fuel injectors could inject fuel into the air within the manifold (indirect injection). The pressure regulator 172 controls fuel pressure from an input fuel supply line to the fuel supply line 174. The individual injector 176 receives control signals from the ECU 140 to control the timed injection of fuel. A spark plug 182 in each of the cylinders receives ignition timing (IGT) control signals from the ECU 140.

The ECU 140 also receives signals from other sensors (not shown) such as a crank sensor indicating rotation of the crankshaft, engine camshaft sensors indicating the timing of the rotation of intake and exhaust camshafts, and exhaust gas sensors (e.g., oxygen sensors) respectively. The ECU 140 communicates other signals to/from other sensors such that the ECU 140 is able to monitor and control operating parameters such as engine speed, engine load, etc.

While FIG. 6 shows a ROM 142 (or RAM 143) as a computer readable storage medium for storing programmed logic such as the ignition timing control logic 152, cylinder activation control logic 154, cylinder deactivation control logic 156 and throttle control logic 158, the programmed logic can instead be accessed from a portable storage medium separate from an engine control unit 140. The portable storage medium may be, for example, a CD-ROM, a DVD, an SD (secure digital) card, a CF (compact flash) card, a SmartMedia card, a memory stick, a MMC (multimedia card), or a portable hard disc drive.

The CPU 141 of the ECU 140 executes the stored cylinder activation control logic 154, thereby forming programmed logic circuitry of a cylinder activation controller. As described in more detail elsewhere in this document, the cylinder activation controller (among other things) determines an engine operating condition, selects a number of active cylinders required for the determined operating condition, and indicates a cylinder which is to be activated in order to provide the selected number of active cylinders. The CPU 141 of the ECU 140 executes the stored cylinder deactivation control logic 156, thereby forming programmed logic circuitry of a cylinder deactivation controller. As described in more detail elsewhere in this document, the cylinder deactivation controller (among other things) determines an engine operating condition, selects a number of active cylinders required for the determined operating condition, and indicates a cylinder which is to be deactivated in order to provide the selected number of active cylinders. The CPU 141 of the ECU 140 executes the stored ignition timing control logic 152, thereby forming programmed logic circuitry of the ignition timing controller. The ignition timing controller (among other things) advances ignition timing for a cylinder that is not to be deactivated and which precedes in firing order a first cylinder which is to be deactivated, and retards ignition timing for a first cylinder in firing order that is to be activated. The CPU 141 of the ECU 140 executes the stored throttle control logic 158, thereby forming programmed logic circuitry of the throttle controller 40 which is discussed in more detail below in connection with FIG. 7

Suddenly closing the valves on a number of cylinders can cause the outflow of air from the manifold to reduce significantly (for example by half if three cylinders of a 6 cylinder engine are deactivated). This can cause the manifold to fill with air, thus reducing the strength of vacuum within the manifold, which may have an effect on the amount of air drawn into each cylinder (causing a torque and/or engine speed shock) and may have a negative effect on auxiliary systems that rely on the manifold vacuum to operate (such as power steering, braking systems etc). In order to avoid a sudden overpressure in the intake manifold, the opening at the throttle can be partially closed to restrict the inflow of air.

In practice however, it has been found that the speed of reaction of the throttle is too slow and as such a short period of overpressure in the intake manifold can occur, which can cause an increase in engine torque which in turn can lead to an engine speed spike.

The approach of the present example proposes two approaches to mitigate the slow response of the throttle at the time of shifting to a reduced number of cylinders operation mode. First, it is useful to understand the processes that cause the lag in throttle movement at the time of the shift to reduced mode operation. There are two primary reasons for slow throttle response that the approaches of the present example aim to mitigate. The first of these is the fact that the throttle is a mechanical system which suffers from inertia in its movements. The second is that the control of the throttle in many engines uses a feedback controller to provide rapid movement to target position under normal operating conditions. This can however act as a low pass filter at a cylinder deactivation event as although the target throttle position has altered, the controller typically acts based upon load (air) error and at the exact time of shift, the air is unchanged and thus the feedback loop does not act to provide quick actuation of throttle response.

The approaches taken in the present example to balance the rate of manifold filling to the rate of manifold emptying at a cylinder deactivation event are illustrated in FIGS. 7 to 10.

Figure 7:
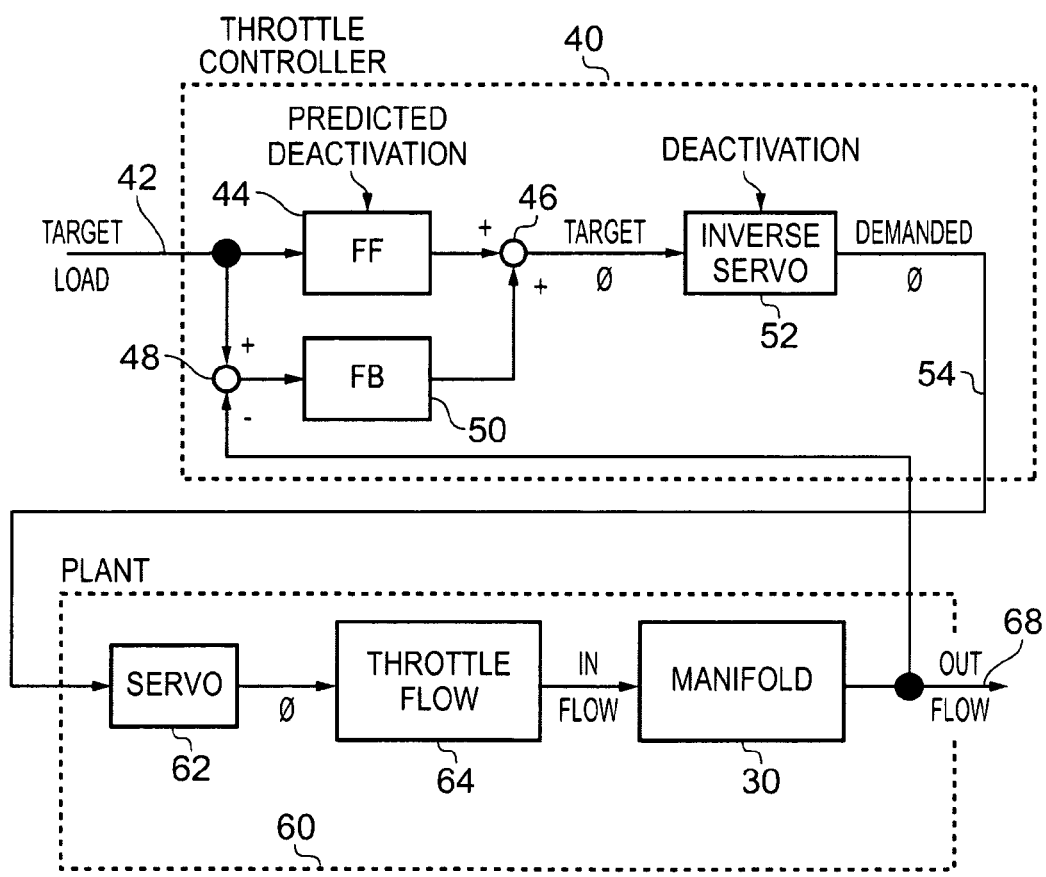
FIG. 7 schematically illustrates processes that affect the flow of air through the intake system to the engine cylinders.

FIG. 7 schematically illustrates the processes that affect the flow of air through the intake system to the engine cylinders. The processes are divided into those that take place in the throttle controller 40, and those that take place within the physical engine plant 60. In the present examples, the throttle controller 40 uses a combined feed-forward controller 44 and feedback controller 50, although other controller types can be used.

Within the controller, a target outflow is provided as an input 42 to the throttle controller 40, this is the target mass of air to enter each cylinder per cylinder cycle. The value is based upon the target torque requirement which is in turn based upon driver or automated control (e.g. cruise control) demand. The target outflow is an input to a feed-forward controller 44 that provides its output to a summer 46. A second input to the summer 46 comes from a feedback control loop. The feedback control loop includes a subtractor 48 that subtracts the actual outflow from the manifold (discussed below) from the target outflow 42 and provides the result as an input to a feedback controller 50. Thus the outputs of the feed-forward 44 controller and feedback controller 50 are summed at the summer 46 to produce a value of the target throttle angle $\Phi$. This target throttle angle $\Phi$ is then fed as the input into an inverse servo controller 52. The output of the inverse servo controller 52 is a demanded value of the throttle angle $\Phi$ which forms the output of the controller 40. During a deactivation event, the feedback part of the controller does not act aggressively as at the exact time of shift, the difference between actual outflow and target outflow of air is at or close to zero. Thus the rapid throttle movement desired for the alteration in engine behaviour at the shift typically cannot be provided by the feedback control part.

The plant 60 receives the demanded $\Phi$ as an input to the throttle servo 62 which provides an actual throttle angle $\Phi$ on the basis of the demanded throttle angle. As mentioned above, this servo may have mechanical delays which cause a time lag between a demanded throttle angle being provided as an input and the actual throttle angle being at the demanded value. The actual throttle angle $\Phi$ in turn acts to define the flow of air through the throttle 34 (illustrated in FIG. 6). The orifice equation that defines the flow based upon th throttle angle is:

$$m_{throttle} = \frac{C_D A(\Phi) p_0}{\sqrt{RT}} f\left(\frac{p}{p_0}\right) \quad (1)$$

Where: $m_{throttle}$ is the mass amount of air passing the throttle; $C_D$ is discharge coefficient; $A(\Phi)$ is throttle open area as a function of throttle angle; $p_0$ is the pressure in the air conduit leading to the throttle 34; R is the gas constant (8.314472 JK$^{-1}$ mol$^{-1}$), T is the temperature at the entrance to the manifold from the inlet conduit, after the throttle; and p is the pressure at the entrance to the manifold from the inlet conduit, after the throttle. The throttle flow 64 is thus the inflow to the manifold 30. Air flows into and through the manifold and the air exits from the manifold 30 via the cylinders into the exhaust system. The outflow from the manifold 68 is used as the subtractive input to the subtractor 48 within the feedback loop of the throttle controller 40. The outflow from the manifold can be calculated in a number of ways, for example by using an air mass meter and applying compensation for intake dynamics, or by using a pressure sensor in the manifold and a volumetric efficiency calculation or by using an intake model, or any combination of these.

First, the operation of these processes at an ordinary operating time of the engine will be briefly discussed. In such a circumstance, the predicted deactivation input shown for the feed-forward controller 44 is inactive. This causes the feed-forward controller 44 to act is a conventional manner for controlling throttle angle. A deactivation input to the inverse servo controller 52 (which can be the same input as that to the feed-forward controller 44) causes the inverse servo controller 52 to be completely inactive (as though it did not exist). The inactivity of the inverse servo controller 52 could instead be controlled by having a switched bypass which is switched under control of the deactivation input. Thus, at an ordinary operating time of the engine, the throttle controller 40 sets a target throttle angle $\Phi$ which is used as the demanded throttle angle $\Phi$ input to the servo 62.

Considering now a cylinder deactivation event, the target load does not change as the intention at a cylinder deactivation event is to continue the present road speed of the vehicle into which the engine is mounted. However, the outflow 68 from the manifold 30 is significantly altered (cut by approximately 50% in the example of a 6 cylinder engine suddenly converting to a 3 cylinder mode). Thus, the ordinary operating mode discussed above can lead to the engine speed and torque shocks previously discussed as the throttle is not adjusted fast enough to take account of the change in outflow.

The present example applies two approaches which can reduce the lag in adjusting the actual throttle angle to take account of the reduced outflow 68 at a cylinder deactivation event.

The first approach is the prediction of the cylinder deactivation event. As the process of shifting an engine into a reduced operating mode is something that is determined based on a set of engine and vehicle operating parameters, there is inevitably some delay between deciding to shift to the reduced mode and actually performing the shift. This enables a prediction of when a cylinder deactivation event is going to occur to be used in the part or parts of an engine management controller that relate to controlling the throttle angle.

Thus, using the deactivation prediction approach, a predicted deactivation signal can be fed as an input to the feed-forward controller 44. This enables the target throttle angle set by the combination of the feed-forward and feedback controller 50 to be controlled to account for the lag caused by the delay in the feedback loop whereby the outflow 68 is used to adjust the target angle. In essence, the target angle $\Phi$ that will be required to account for the change in outflow can be set before the outflow actually changes (i.e. before the shift to reduced mode actually occurs) so that the throttle angle is closer to reaching the correct angle at the time the cylinder deactivation event actually occurs.

Figure 8:
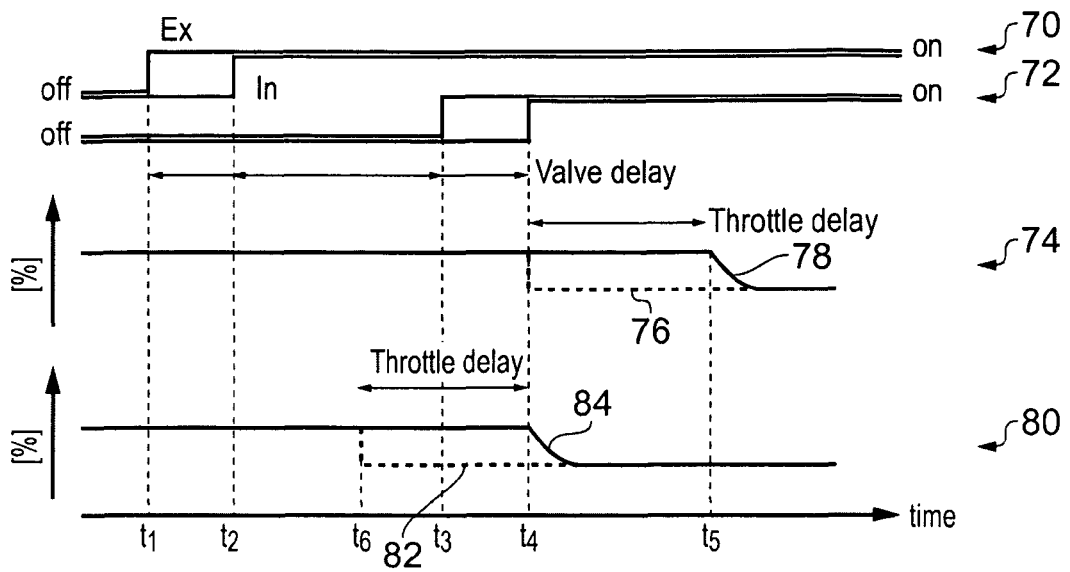
FIG. 8 illustrates a deactivation prediction approach.

The deactivation prediction approach is further illustrated in FIG. 8. The graph at 70 shows valve deactivation control signals. A valve deactivation control makes a control decision which generates the control signals shown to cause at $t_1$ the cylinder exhaust valves to be closed and at time $t_2$ the intake valve to be closed, for cylinders which are to be deactivated. The graph at 72 shows actual valve deactivation. As can be seen, the actual valve deactivation takes place a short time later than indicated the control signals, at $t_3$ for the exhaust valves and $t_4$ for the intake valves (the valve delay). It is this valve delay that enables the deactivation prediction to be used for throttle control.

The graph at 74 in FIG. 8 shows the behaviour of the throttle if the deactivation prediction is not applied. In this situation, the target throttle angle is caused to change at the time $t_4$ of actual intake valve deactivation (which is the time at which the manifold stops losing air into the deactivated cylinders). The target throttle angle value is shown by the dashed line 76 and the actual throttle angle is shown by solid line 78. As can be seen, due to the fact that the target throttle angle is not changed until the valves are actually deactivated ($t_4$), the lag in the throttle (the throttle delay) causes the actual throttle angle to not start changing to the target angle until time $t_5$.

The graph at 80 in FIG. 8 shows the behaviour of the throttle with the deactivation prediction applied. In this situation, the target throttle 82 is set to the desired throttle position at a time $t_6$, which precedes the actual valve deactivation time $t_4$ by the length of the throttle delay. This is possible as the throttle delay is known or can be estimated (this can be measured, calculated or estimated for a given engine or engine type/setup) and is shorter that the valve delay, which is also known or can be estimated (this can be measured, calculated or estimated for a given engine or engine type/setup). This early alteration of the target throttle angle means that at the end of the throttle delay, which corresponds to actual intake valve deactivation at $t_4$, the actual throttle angle 84 changes to the value that is required following the cylinder deactivation event.

The exact time at which the target throttle is set to the desired throttle position need not be exactly equal to the length of the throttle delay in advance of the actual intake valve deactivation. For example, it may be appropriate to initiate the throttle movement earlier than the actual intake valve deactivation to take account of the transient effects of the throttle movement under control of the servo. In one example, the target throttle may be set to the new required value at a time advance equal to between 100% and 120% of the throttle delay prior to the actual intake valve deactivation. The timing of the target throttle change may be other than exactly the same as the throttle delay where the throttle delay is itself not the same at all times. For example the throttle delay may alter according to temperature in the engine compartment. In such an example, the timing for setting the target throttle to the desired value may be the same as an estimated throttle delay, but the actual throttle delay may be greater of less than the estimate.

The second approach is application of an inverse servo control to the throttle controller 40. This inverse servo controller 52 alters the target throttle angle supplied to the servo 62 to a demanded throttle angle. The term demanded is used to distinguish from target as the aim is not to make the throttle actually adopt the demanded angle, rather the aim is to use the demanded angle to address the slow response of the servo to the input angle requested of the servo. Specifically, the demanded throttle angle is set to be far beyond the target angle in the required direction of movement so as to encourage a faster response from the servo. The inverse servo controller 52 is arranged to provide that at the time that the servo will reach, on its way to achieving the initially demanded angle, the target angle, the demanded angle is altered to be the target angle. As such the alteration applied to the target angle to produce the demanded angle is, in effect, a transient overcorrection with the aim of reducing transient effects in the servo 62. At times other than a cylinder deactivation (or reactivation) event, the inverse servo is not required to be active as this could introduce undesired harshness into the throttle response.

Figure 9A:
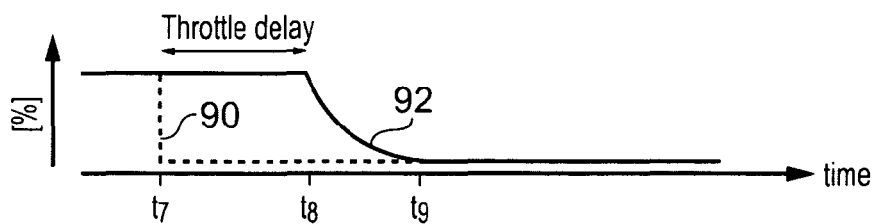
FIG. 9a illustrates the action of the throttle angle in response to the target throttle angle provided to the servo without the inverse servo throttle being active.

FIG. 9a illustrates the action of the throttle angle in response to the target throttle angle provided to the servo 62 without the inverse servo throttle being active. This illustrates that then the target throttle angle 90 is changed at $t_7$, the actual throttle angle 92 experiences the throttle delay (as discussed above with reference to FIG. 8) before staring to change at $t_8$ and then finally arriving at the target at time $t_9$. A simplified description to provide approximately the actual throttle angle at any given instant is as follows:

$$\Phi(i) = \Phi(i-1) - T \cdot G \cdot (\Phi(i-1) - \Phi_{Target}) \quad (2)$$

Where: $\Phi(i)$ is the present value of the throttle angle; $\phi(i-1)$ is the previous value of the throttle angle; T is sampling time; G is filter factor parameter; and $\phi_{Target}$ is the target throttle angle provided to the servo.

Figure 9B:
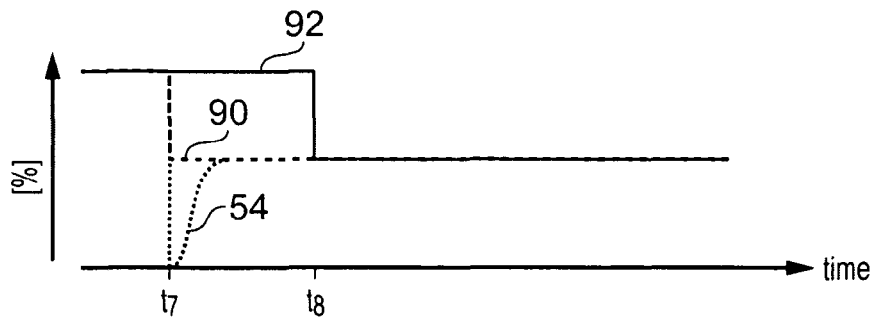
FIG. 9b shows the action of the throttle angle in response to the demanded throttle angle set by the inverse servo control.

In contrast, FIG. 9b shows the action of the throttle angle in response to the demanded throttle angle set by the inverse servo controller 52. In FIG. 9b, the target throttle angle 90 changes at time $t_7$ and, following the throttle delay, at time $t_8$ the actual throttle angle 92 transitions almost instantly to the target throttle angle 90. This is caused by, instead of feeding the target throttle angle 90 to the servo 62, feeding the demanded throttle angle 54 to the servo 62. The large overcorrection in the actual throttle angle that is initially requested by the demanded throttle angle 54 causes the throttle servo to respond much more rapidly, resulting in the rapid transition. The inverse servo does not counter the throttle delay, but does address the internal servo dynamics of the servo 62 that under conventional circumstances causes the throttle to transition more slowly to the new requested position. The equation that, in the present example, sets the value of the demanded throttle position is:

$$\Phi_{Demanded} = \Phi(i-1) + \frac{1}{T \cdot G} \cdot (\Phi_{Target} - \Phi(i-1)) \quad (3)$$

Where: $\Phi_{Demanded}$ is the demanded value of the throttle angle from the inverse servo controller 52; $\Phi(i-1)$ is the previous value of the actual throttle angle; T is sampling time; G is filter factor parameter; and $\Phi_{Target}$ is the target throttle angle provided to the servo.

As is clear from both FIG. 8 and FIGS. 9a and 9b, the difference in speed of achieving the required actual throttle angle can be significant when the one or both of the two approaches for controlling throttle position at a cylinder deactivation event is used.

Figures 10A, 10B, 10C:
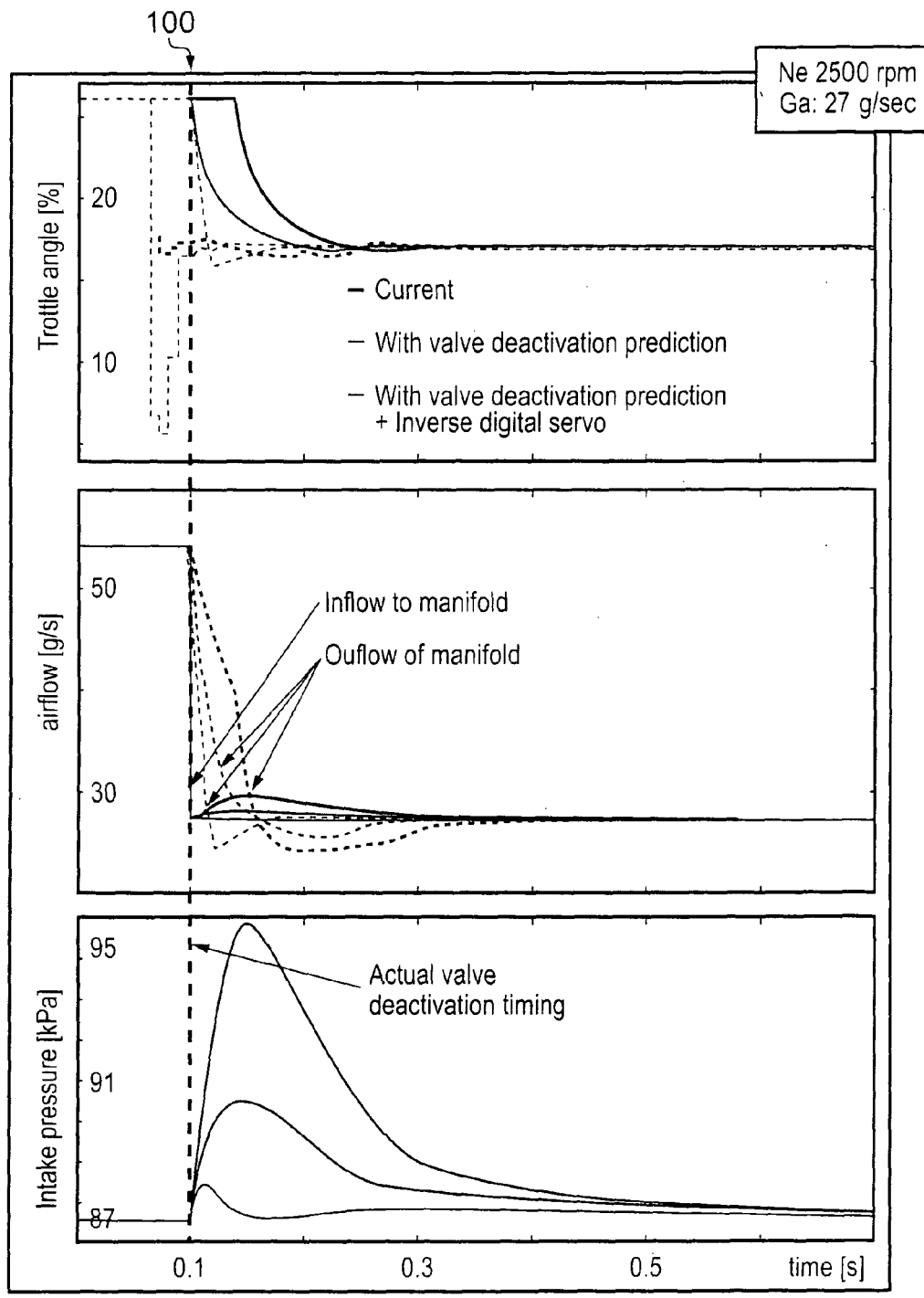
FIG. 10a depicts the behaviour of the throttle angle over time relative the actual shift to reduced mode.
FIG. 10b shows the effect of the throttle angle movement on the airflow into and out of the manifold.
FIG. 10c shows the effect of the throttle angle movement on the intake pressure.

The action of the two approaches of valve deactivation prediction and of inverse servo control is further illustrated in FIGS. 10a, 10b and 10c.

FIG. 10a depicts the behaviour of the throttle angle over time relative the actual shift to reduced mode shown by the heavy dashed line. As can be seen, by employing only the valve deactivation approach, the throttle angle starts to change at the time of the shift to reduced mode (compared to the delayed commencement of movement where no prediction is used). When the inverse servo control is also used, the throttle angle not only starts to move at the time of the shift to reduced mode operation, but also moves very rapidly to the required angle, thereby avoiding the slow movement of the throttle which appears in the no prediction/no inverse servo and the prediction only approaches.

FIG. 10b shows the effect of the throttle angle movement on the airflow into and out of the manifold. This graph includes inflow and outflow lines for the approach with both the valve deactivation prediction and the inverse servo control and outflow only lines for the no prediction/no inverse servo and the prediction only approaches.

FIG. 10c shows the effect of the throttle angle movement on the intake pressure in the intake manifold and it is immediately clear that the most smooth curve is for the prediction and inverse servo approach, the next most smooth line is for the prediction only approach and the least smooth line is for the no prediction/no inverse servo approach.

Accordingly, the skilled reader will now appreciate that the two approaches for controlling throttle angle at a shift to a reduced operating mode can each significantly improve the smoothness of the shift, and that the approaches can be employed separately or in combination.

The skilled reader will also appreciate that the same approach of prediction and inverse servo control can be used when a cylinder activation event occurs during a shift from a reduced mode of operation to a full or less reduced mode of operation. As with the cylinder deactivation, there is a lag between the control signal to reactivate the valves being issued and the valves actually restarting. This allows prediction of the reactivation of the cylinders and allows control of the throttle angle to be advanced using that prediction (as discussed above with reference to FIG. 8) such that the throttle delay is countered when adjusting the throttle to account for the sudden increase in manifold outflow caused by the increased number of active cylinders. Also, the reactivation of cylinders in a shift from a reduced operation mode can use the inverse servo control to increase the movement speed of the throttle to provide for a smoothed shift (as discussed above with reference to FIG. 9).

Thus there have now been described various approaches to smoothing the transition between operating modes of a cylinder deactivation engine. Specifically, the approaches can provide for altering ignition timing of final firings of cylinders prior to the shift between modes to smooth the rolling average torque generated by the engine. Also, the approaches can provide for altered control of the throttle at the time of a shift between modes to smooth the rolling average torque generated by the engine. Each of these techniques can be employed individually or in combination with the other ones of the techniques to provide for a smooth transition between operating modes without significant torque shock and associated engine speed shock at the time of the transition.

Specific examples of engine management systems and methods, as well as engines and automobiles making use of the engine management systems and/or methods have been described. The skilled reader will appreciate that the concepts disclosed herein can be applied outside the scope of the examples given and that the scope of invention shall rather be determined by the spirit and scope of the appended claims. That is, while example embodiments of the invention are susceptible to various modifications and alternative forms, specific embodiments have been shown above by way of example in the drawings and are described above in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

The invention claimed is:

1. An engine management unit comprising:
a cylinder deactivation controller having configuration to determine an engine operating condition and select a number of active cylinders required for the determined operating condition and to indicate a cylinder which is to be deactivated in order to provide the selected number of active cylinders;
an ignition timing controller having configuration to advance ignition timing for a cylinder that is not to be deactivated and which precedes in firing order a first cylinder which is to be deactivated.

2. The engine management unit of claim 1, wherein the ignition timing controller has a configuration to use a weighted advance to advance the ignition timing for the cylinder that is not to be deactivated and which precedes in firing order a first cylinder which is to be deactivated.

3. The engine management unit of claim 2, wherein the ignition timing controller has a configuration to choose an ignition advance weight in dependence upon one or more of current engine speed, current torque reserve, current instantaneous torque, target torque reserve and target instantaneous torque.

4. The engine management unit of claim 1, wherein the cylinder deactivation controller has a configuration to select between two or more predetermined numbers of active cylinders.

5. The engine management unit of claim 1, wherein the cylinder deactivation controller has a configuration to indicate a cylinder which is to be activated in order to provide the selected number of active cylinders and wherein the ignition timing controller has a configuration to retard ignition timing for the cylinder which precedes in firing order a first cylinder that is to be activated.

6. The engine management unit of claim 5, wherein the ignition timing controller has a configuration to use a weighted retard to retard the ignition timing for the first cylinder in firing order that is to be activated.

7. The engine management unit of claim 6, wherein the ignition timing controller has a configuration to choose an ignition retard weight in dependence upon one or more of current engine speed, current torque reserve, and current instantaneous torque.

8. The engine management unit of claim 1, further comprising a throttle controller having a configuration to predict the time at which the first cylinder to be deactivated will be deactivated and provide a throttle control signal to an engine throttle servo in advance of the predicted time.

9. The engine management unit of claim 8, wherein the throttle controller has a configuration to provide the throttle control signal at a time to cause the throttle to move to a required position at the predicted time.

10. The engine management unit of claim 8, wherein the throttle controller further comprises an inverse servo controller having a configuration to adjust the throttle control signal to cause rapid movement of the throttle at the time that the engine throttle servo reacts to the throttle control signal.

11. The engine management unit of claim 1, further comprising a throttle controller having a configuration to adjust a throttle control signal to cause rapid movement of an engine throttle at the time that an engine throttle servo in receipt of the throttle control signal reacts to the throttle control signal.

12. An engine management unit comprising:
a cylinder activation controller having a configuration to determine an engine operating condition and select a number of active cylinders required for the determined operating condition and to indicate a cylinder which is to be activated in order to provide the selected number of active cylinders;
an ignition timing controller having a configuration to retard ignition timing for a cylinder that precedes in firing order the first cylinder that is to be activated.

13. The engine management unit of claim 12, wherein the ignition timing controller has a configuration to use a weighted retard to retard the ignition timing for the first cylinder in firing order that is to be activated.

14. The engine management unit of claim 13, wherein the ignition timing controller has a configuration to choose an ignition retard weight in dependence upon one or more of current engine speed, current torque reserve, current instantaneous torque, target torque reserve and target instantaneous torque.

15. The engine management unit of claim 12, wherein the cylinder activation controller has a configuration to select between two or more predetermined numbers of active cylinders.

16. The engine management unit of claim 12, wherein the cylinder activation controller has a configuration to indicate a cylinder which is to be deactivated in order to provide the selected number of active cylinders and wherein the ignition timing controller has a configuration to advance ignition timing for a cylinder that is not to be deactivated and which precedes in firing order a first cylinder which is to be deactivated.

17. The engine management unit of claim 12, further comprising a throttle controller having a configuration to that predict the time at which the first cylinder to be activated will be activated and provide a throttle control signal to an engine throttle servo in advance of the predicted time.

18. The engine management unit of claim 17, wherein the throttle controller further comprises an inverse servo controller having a configuration to adjust the throttle control signal to cause rapid movement of the throttle at the time that the engine throttle servo reacts to the throttle control signal.

19. The engine management unit of claim 12, further comprising a throttle controller has a configuration to adjust a throttle control signal to cause rapid movement of an engine throttle at the time that an engine throttle servo in receipt of the throttle control signal reacts to the throttle control signal.

20. A method of managing a number of active cylinders of an engine, the method comprising:
determining for a current engine operating condition a number of active cylinders required for the current engine operating condition;
if the determined number of active cylinders is different than a current number of active cylinders, selecting one or more cylinder which is to be activated or deactivated in order to provide the determined number of active cylinders;
where one or more cylinders is to be activated, retarding ignition timing for the first firing of a first activated cylinder in firing order; and
where one or more cylinders is to be deactivated, advancing ignition timing for a cylinder that is not to be deactivated and which precedes in firing order a first cylinder which is to be deactivated.

21. A method of managing an engine, the method comprising:
determining an engine operating condition;
selecting a number of active cylinders required for the determined operating condition;
indicating a cylinder which is to be deactivated in order to provide the selected number of active cylinders; and
advancing ignition timing for a cylinder that is not to be deactivated and which precedes in firing order a first cylinder which is to be deactivated.

22. The method of claim 21, further comprising: indicating a cylinder which is to be activated in order to provide the selected number of active cylinders, and retarding ignition timing for the cylinder which precedes in firing order a first cylinder that is to be activated.

23. The method of claim 21, further comprising predicting the time at which the first cylinder to be deactivated will be deactivated, and providing a throttle control signal to an engine throttle servo in advance of the predicted time.

24. A method of managing an engine, the method comprising:
determining an engine operating condition;
selecting a number of active cylinders required for the determined operating condition;
indicating a cylinder which is to be activated in order to provide the selected number of active cylinders; and
retarding ignition timing for a cylinder that precedes in firing order the first cylinder that is to be activated.

25. The method of claim 24, further comprising: indicating a cylinder which is to be deactivated in order to provide the selected number of active cylinders, and advancing ignition timing for a cylinder that is not to be deactivated and which precedes in firing order a first cylinder which is to be deactivated.

26. The method of claim 24, further comprising predicting the time at which the first cylinder to be activated will be activated, and providing a throttle control signal to an engine throttle servo in advance of the predicted time.

* * * * *